(12) United States Patent
Misawa

(10) Patent No.: US 10,644,540 B2
(45) Date of Patent: May 5, 2020

(54) CONTACTLESS POWER TRANSMISSION DEVICE AND POWER TRANSFER SYSTEM

(71) Applicant: TOYOTA JIDOSHA KABUSHIKI KAISHA, Toyota-shi, Aichi-ken (JP)

(72) Inventor: Takahiro Misawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1003 days.

(21) Appl. No.: 15/175,482

(22) Filed: Jun. 7, 2016

(65) Prior Publication Data

US 2017/0025898 A1 Jan. 26, 2017

(30) Foreign Application Priority Data

Jul. 21, 2015 (JP) .................................. 2015-143736

(51) Int. Cl.
*H02J 50/12* (2016.01)
*H02J 7/02* (2016.01)
*H02M 3/337* (2006.01)
*H02M 1/00* (2006.01)

(52) U.S. Cl.
CPC .............. *H02J 50/12* (2016.02); *H02J 7/025* (2013.01); *H02M 3/3376* (2013.01); *H02M 2001/0051* (2013.01); *H02M 2001/0058* (2013.01); *Y02B 70/1491* (2013.01)

(58) Field of Classification Search
CPC ............ H02J 50/12; H02J 7/025; H02J 5/005
See application file for complete search history.

(56) References Cited

U.S. PATENT DOCUMENTS

| | | | |
|---|---|---|---|
| 7,741,734 | B2 | 6/2010 | Joannopoulos et al. |
| 2007/0222542 | A1 | 9/2007 | Joannopoulos et al. |
| 2008/0278264 | A1 | 11/2008 | Karalis et al. |
| 2009/0195332 | A1 | 8/2009 | Joannopoulos et al. |
| 2009/0195333 | A1 | 8/2009 | Joannopoulos et al. |
| 2009/0224856 | A1 | 9/2009 | Karalis et al. |
| 2009/0267709 | A1 | 10/2009 | Joannopoulos et al. |
| 2009/0267710 | A1 | 10/2009 | Joannopoulos et al. |
| 2010/0096934 | A1 | 4/2010 | Joannopoulos et al. |
| 2010/0102639 | A1 | 4/2010 | Joannopoulos et al. |
| 2010/0102640 | A1 | 4/2010 | Joannopoulos et al. |
| 2010/0102641 | A1 | 4/2010 | Joannopoulos et al. |

(Continued)

FOREIGN PATENT DOCUMENTS

| | | |
|---|---|---|
| AU | 2006269374 B2 | 1/2007 |
| AU | 2007349874 A2 | 10/2008 |

(Continued)

*Primary Examiner* — Alfonso Perez Borroto
(74) *Attorney, Agent, or Firm* — Oliff PLC

(57) ABSTRACT

A power transmission device includes a power transmission unit and a voltage-source inverter. A power supply ECU executes turn-on current control for controlling a turn-on current It to a target current Itr by adjusting a drive frequency f of the inverter, turn-on current It indicating an output current of the inverter at a rising of an output voltage of the inverter. A first case is a case where transmission power Ps has a first value which is lower than target power Psr and a second case is a case where the transmission power has a second value which is closer to target power Psr than the first value. The power supply ECU makes a change rate of the drive frequency in the second case lower than in the first case.

6 Claims, 7 Drawing Sheets

(56) References Cited

U.S. PATENT DOCUMENTS

| | | |
|---|---|---|
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2016/0064951 A1* | 3/2016 | Yamamoto .............. H02J 17/00 307/104 |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2014-207795 A | 10/2014 |
| KR | 2008-0031398 A | 4/2008 |
| KR | 2010-0015954 A | 2/2010 |
| WO | 2007/008646 A2 | 1/2007 |
| WO | 2008/118178 A1 | 10/2008 |

\* cited by examiner

CONTACTLESS POWER TRANSMISSION DEVICE AND POWER TRANSFER SYSTEM

This nonprovisional application is based on Japanese Patent Application No. 2015-143736 filed on Jul. 21, 2015 with the Japan Patent Office, the entire contents of which are hereby incorporated by reference.

BACKGROUND OF THE INVENTION

Field of the Invention

The present invention relates to a contactless power transmission device and a power transfer system, and more particularly to a power control technique in a contactless power transmission device that transmits electric power to a power reception device in a contactless manner.

Description of the Background Art

Japanese Patent Laying-Open No. 2014-207795 discloses a contactless power feeding system that supplies electric power from a power feeding device (power transmission device) to a vehicle (power reception device) in a contactless manner. In this contactless power feeding system, the power feeding device includes a power transmission coil, an inverter and a control unit. The power transmission coil transmits electric power to the power reception coil mounted on the vehicle in a contactless manner. The inverter produces an AC current in accordance with a drive frequency for output to the power transmission coil. The control unit obtains a charging power command for a battery and output power for the battery from the vehicle side, and controls by feedback the drive frequency of the inverter such that the output power follows the charging power command.

When the inverter is a voltage-source inverter and supplies transmission power in accordance with the drive frequency to the power transmission unit, transmission power can be controlled by adjusting the duty of an inverter output voltage. By controlling the drive frequency of the inverter, a turn-on current indicating an inverter output current at the rising of the inverter output voltage can be controlled.

It is known that in the voltage-source inverter, if an output current of the same sign as the output voltage (i.e., positive turn-on current) flows at the rising of the output voltage, a recovery current flows into freewheel diodes of the inverter. When a recovery current flows, the freewheel diodes generate heat, resulting in increase in losses. Therefore, by adjusting the drive frequency of the inverter, the turn-on current is controlled to a target value (a value less than or equal to 0). Accordingly, losses caused by the recovery current can be suppressed.

When changing the drive frequency of the inverter, however, a load on the power transmission unit as seen from the inverter changes, so that the transmission power changes. If the transmission power changes in the direction that electric power increases, an overshoot amount of transmission power may become larger than the target power. To suppress a deviation from the target power, it is desirable to minimize the overshoot amount.

SUMMARY OF THE INVENTION

The present invention was made to solve the above-described problems, and has an object to provide a contactless power transmission device and a power transfer system that can search for an operating point at which a turn-on current matches a target value while minimizing an overshoot amount of transmission power from target power.

The present invention is directed to a contactless power transmission device including a power transmission unit configured to transmit electric power to a power reception device in a contactless manner, a voltage-source inverter configured to supply transmission power to the power transmission unit, and a control unit configured to control the inverter. The control unit is configured to execute a first control for controlling the transmission power to target power by adjusting a duty of an output voltage of the inverter, and a second control for controlling a turn-on current by adjusting a drive frequency of the inverter, the turn-on current indicating an output current of the inverter at a rising of the output voltage of the inverter. A first case is a case where the transmission power has a first value which is lower than the target power and a second case is a case where the transmission power has a second value which is closer to the target power than the first value. The control unit makes a change rate of the drive frequency in the second case lower than in the first case.

With the above-described configuration, when the power difference between the transmission power and the target power is decreased, the change rate of the drive frequency is also decreased. Then, the transmission power when adjusting the drive frequency with a shift in the drive frequency will not be greatly deviated from the target power, which improves the followability of the transmission power to the target power. An overshoot amount of the transmission power from the target power can thereby be minimized.

Preferably, when changing the drive frequency in the second control, a change amount of the drive frequency per one adjusting operation of the drive frequency is constant, and a changing cycle of the drive frequency in the second case is longer than a changing cycle of the drive frequency in the first case.

The change rate of the drive frequency when adjusting the drive frequency can be changed by changing the relation between the cycle of updating the drive frequency and the change amount of the drive frequency. By extending the cycle of updating the drive frequency in the second control as described above, the change rate of the drive frequency can be decreased.

Preferably, when changing the drive frequency in the second control, a changing cycle of the drive frequency is constant, and a change amount of the drive frequency per one adjusting operation of the drive frequency in the second case is smaller than a change amount of the drive frequency per one adjusting operation of the drive frequency in the first case.

The change rate of the drive frequency when adjusting the drive frequency can be changed by changing the relation between the cycle of updating the drive frequency and the change amount of the drive frequency. By reducing the change amount of the drive frequency in the second control as described above, the change rate of the drive frequency can be decreased.

Another aspect of the present invention is directed to a power transfer system including any of the power transmission devices described above and a power reception device.

According to the present invention, during contactless power transmission, an operating point at which a turn-on current matches a target value can be searched for while minimizing an overshoot amount of transmission power from target power.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
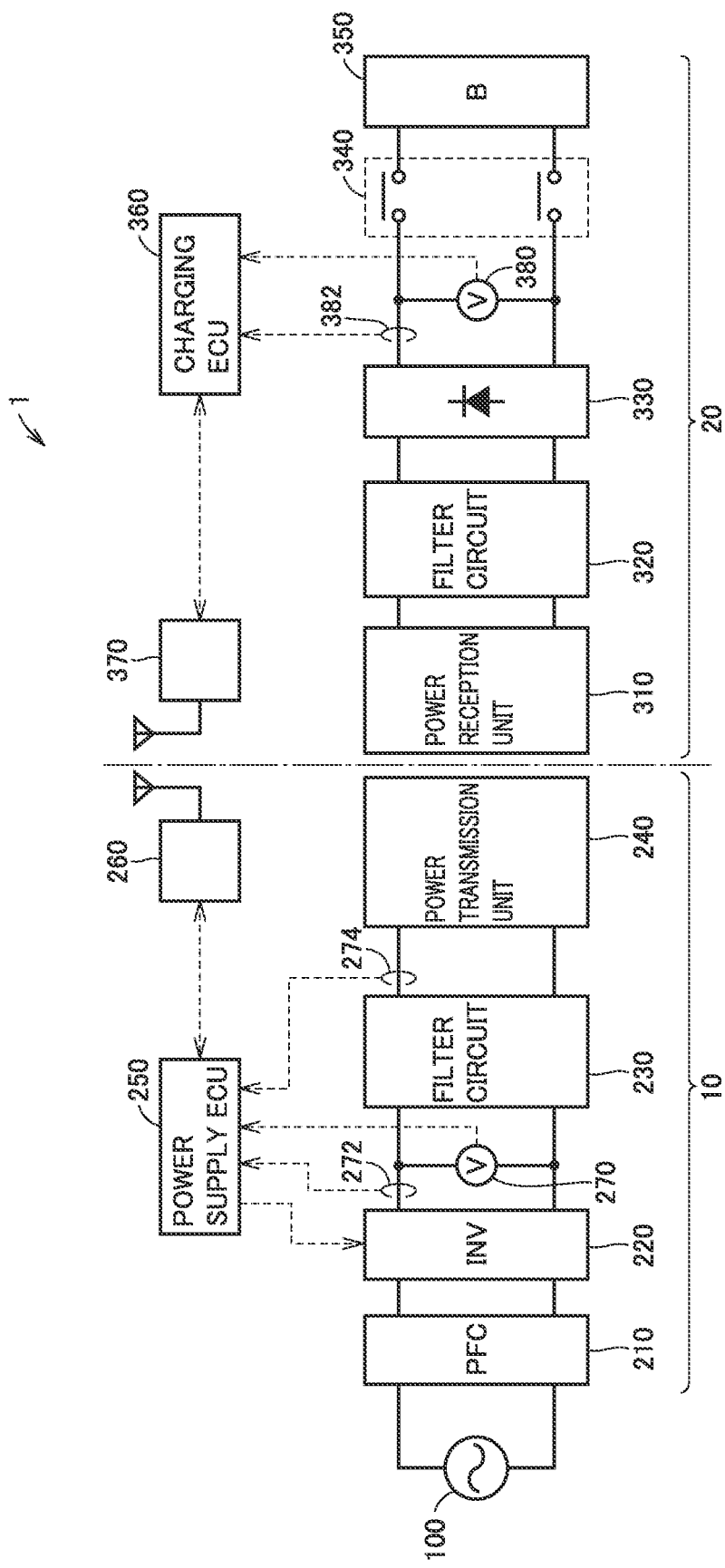
FIG. 1 shows an overall configuration of a power transfer system to which a contactless power transmission device according to an embodiment of the present invention is applied.

Hereinafter, an embodiment of the present invention will be described in detail with reference to the drawings. In the drawings, the same or corresponding portions have the same reference characters allotted, and description thereof will not be repeated.

[Overall Configuration of Power Transfer System]

FIG. 1 is an overall configuration of a power transfer system to which a contactless power transmission device according to an embodiment of the present invention is applied. Referring to FIG. 1, a power transfer system 1 includes a power transmission device 10 and a power reception device 20. Power reception device 20 may be mounted on a vehicle or the like that can travel using electric power supplied from power transmission device 10 and stored therein, for example.

Power transmission device 10 includes a power factor correction (PFC) circuit 210, inverter 220, a filter circuit 230, and a power transmission unit 240. Power transmission device 10 further includes a power supply ECU (Electronic Control Unit) 250, a communication unit 260, a voltage sensor 270, and current sensors 272, 274.

PFC circuit 210 can rectify and boost AC power received from an AC power supply 100 (e.g., system power supply) for supply to inverter 220 and can bring an input current close to a sine wave, thereby correcting the power factor. Any of publicly known various PFC circuits can be adopted as PFC circuit 210. Instead of PFC circuit 210, a rectifier without the power factor correcting function may be adopted.

Inverter 220 converts DC power received from PFC circuit 210 into transmission power (AC power) having a predetermined transmission frequency. The transmission power produced by inverter 220 is supplied to power transmission unit 240 through filter circuit 230. Inverter 220 is a voltage-source inverter, in which a freewheel diode is connected in antiparallel to each of switching elements that constitute inverter 220 (see FIG. 3). Inverter 220 is implemented by a single-phase full bridge circuit, for example.

Filter circuit 230 is provided between inverter 220 and power transmission unit 240, and suppresses a harmonic noise caused by inverter 220. Filter circuit 230 is implemented by an LC filter including an inductor and a capacitor, for example.

Power transmission unit 240 receives AC power (transmission power) having a transmission frequency from inverter 220 through filter circuit 230, and transmits the electric power in a contactless manner to a power reception unit 310 of power reception device 20 through an electromagnetic field produced around power transmission unit 240. Power transmission unit 240 includes a resonant circuit for transmitting electric power to power reception unit 310 in a contactless manner, for example. Although the resonant circuit may be composed of a coil and a capacitor, the capacitor may be omitted when a desired resonant state is achieved only with the coil.

Voltage sensor 270 detects an output voltage of inverter 220, and outputs a detected value to power supply ECU 250. Current sensor 272 detects an output current of inverter 220, and outputs a detected value to power supply ECU 250. Current sensor 274 detects a current flowing in power transmission unit 240, and outputs a detected value to power supply ECU 250. Based on the detected values of voltage sensor 270 and current sensor 272, transmission power supplied from inverter 220 to power transmission unit 240 (i.e., electric power output from power transmission unit 240 to power reception device 20) can be detected.

Power supply ECU 250, including a CPU (Central Processing Unit), a memory device, an input/output buffer, and the like (neither shown), receives signals from various sensors and devices, and controls various devices in power transmission device 10. As an example, power supply ECU 250 exerts switching control of inverter 220 such that inverter 220 produces transmission power (AC power) when power transmission from power transmission device 10 to power reception device 20 is executed. Various types of controls executed by power supply ECU 250 are not limited to processing by software, but can also be processed by dedicated hardware (an electronic circuit).

As main control executed by power supply ECU 250, power supply ECU 250 executes feedback control (hereinafter also referred to as "transmission power control") for controlling transmission power to target power when power transmission from power transmission device 10 to power reception device 20 is executed. Specifically, power supply ECU 250 controls transmission power to target power by adjusting the duty of an output voltage of inverter 220. The duty of an output voltage is defined as a ratio of a positive (or negative) voltage output time period to the cycle of an output voltage waveform (square wave). The duty of an inverter output voltage can be adjusted by changing the operating timing of the switching elements of inverter 220. Target power may be produced based on the power reception state of power reception device 20, for example. In the present embodiment, power reception device 20 produces target power for transmission power based on the difference between a target value and a detected value of received power, and transmits the target power to power transmission device 10.

Power supply ECU 250 executes feedback control for controlling a turn-on current in inverter 220 to a target value (hereinafter also referred to as "turn-on current control") while executing the above-described transmission power control. The turn-on current is an instantaneous value of the output current of inverter 220 at the rising of the output voltage of inverter 220. If the turn-on current has a positive value, a reverse recovery current flows into the freewheel diodes of inverter 220, causing heat (i.e., losses) to be generated in the freewheel diodes. Therefore, the above-described target value for the turn-on current control (turn-on current target value) is set to fall within the range where a recovery current is not produced in the freewheel diodes of inverter 220, and is basically set at a predetermined value of less than or equal to 0. As the turn-on current target value, "0" at which the power factor is improved is ideal, but a negative value may also be selected affording a margin. The turn-on current target value may be set at a positive value which is small to such a degree that losses caused by a recovery current are negligible. The transmission power control and turn-on current control will be described later in detail.

Communication unit 260 is configured to make wireless communications with a communication unit 370 of power reception device 20, and receives a target value for transmission power (target power) transmitted from power reception device 20, and also exchanges information including start/stop of power transmission, the power reception state of power reception device 20, and the like with power reception device 20.

On the other hand, power reception device 20 includes power reception unit 310, a filter circuit 320, a rectification unit 330, a relay circuit 340, and a power storage device 350. Power reception device 20 further includes a charging ECU 360, communication unit 370, a voltage sensor 380, and a current sensor 382.

Power reception unit 310 receives electric power (AC power) output from power transmission unit 240 of power transmission device 10 in a contactless manner. Power reception unit 310 includes a resonant circuit for receiving electric power from power transmission unit 240 in a contactless manner, for example. Although the resonant circuit may be composed of a coil and a capacitor, the capacitor may be omitted when a desired resonant state is achieved only with the coil. Power reception unit 310 outputs received power to rectification unit 330 through filter circuit 320.

Filter circuit 320 is provided between power reception unit 310 and rectification unit 330, and suppresses a harmonic noise produced at the time of power reception. Filter circuit 320 is implemented by an LC filter including an inductor and a capacitor, for example. Rectification unit 330 rectifies AC power received by power reception unit 310 for output to power storage device 350.

Power storage device 350 is a rechargeable DC power supply, and is implemented to include a secondary battery, such as a lithium-ion battery or a nickel-metal hydride battery, for example. Power storage device 350 stores electric power output from rectification unit 330, and supplies the stored electric power to a load driving device not shown. A large-capacity capacitor can also be adopted as power storage device 350.

Relay circuit 340 is provided between rectification unit 330 and power storage device 350, and is turned on when power storage device 350 is charged by power transmission device 10. Although not shown, a DC/DC converter that adjusts an output voltage of rectification unit 330 may be provided between rectification unit 330 and power storage device 350 (e.g., between rectification unit 330 and relay circuit 340).

Voltage sensor 380 detects an output voltage (a voltage of received power) of rectification unit 330, and outputs the detected value to charging ECU 360. Current sensor 382 detects an output current (a current of received power) from rectification unit 330, and outputs the detected value to charging ECU 360. Based on the detected values of voltage sensor 380 and current sensor 382, electric power received by power reception unit 310 (i.e., charging power for power storage device 350) can be detected. Voltage sensor 380 and current sensor 382 may be provided between power reception unit 310 and rectification unit 330 (e.g., between filter circuit 320 and rectification unit 330).

Charging ECU 360, including a CPU, a memory device, an input/output buffer, and the like (neither shown), receives signals from various sensors and devices, and controls various devices in power reception device 20. Various types of controls are not limited to processing by software, but may be processed by dedicated hardware (an electronic circuit).

As main control executed by charging ECU 360, during power reception from power transmission device 10, charging ECU 360 produces a target value for transmission power (target power) in power transmission device 10 such that received power in power reception device 20 attains a desired target value. Specifically, charging ECU 360 produces the target value for transmission power in power transmission device 10 based on the difference between the detected value and the target value for received power. Charging ECU 360 then transmits the produced target value for transmission power (target power) to power transmission device 10 through communication unit 370.

Communication unit 370 is configured to make wireless communications with communication unit 260 of power transmission device 10, and transmits the target value for transmission power (target power) produced in charging ECU 360 to power transmission device 10, exchanges information on start/stop of power transmission with power transmission device 10, and transmits the power reception state of power reception device 20 (a voltage of received power, a current of received power, received power, and the like) to power transmission device 10.

Figure 2:
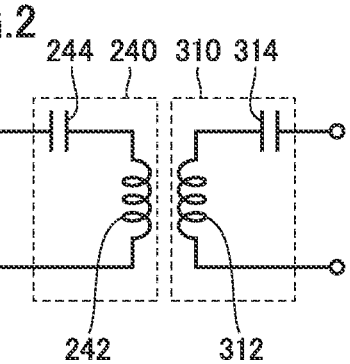
FIG. 2 illustrates an example of a circuit configuration of a power transmission unit 240 and a power reception unit 310 shown in FIG. 1.

FIG. 2 illustrates an example of a circuit configuration of power transmission unit 240 and power reception unit 310 shown in FIG. 1. Referring to FIG. 2, power transmission unit 240 includes a coil 242 and a capacitor 244. Capacitor 244 is provided to compensate for the power factor of transmission power, and is connected in series with coil 242. Power reception unit 310 includes a coil 312 and a capacitor 314. Capacitor 314 is provided to compensate for the power factor of received power, and is connected in series with coil 312. Such a circuit configuration is also called an SS (primary series-secondary series) arrangement.

Although not shown, the configuration of power transmission unit 240 and power reception unit 310 is not limited to that of the SS arrangement. For example, an SP (primary series-secondary parallel) arrangement with which capacitor 314 is connected in parallel with coil 312 in power reception unit 310 may be adopted, or a PP (primary parallel-secondary parallel) arrangement with which capacitor 244 is connected in parallel with coil 242 in power transmission unit 240 may be adopted.

Referring again to FIG. 1, in power transfer system 1, transmission power (AC power) is supplied from inverter 220 to power transmission unit 240 through filter circuit 230. Power transmission unit 240 and power reception unit 310 each include a coil and a capacitor, and are designed to resonate at a transmission frequency. The Q factor indicating the resonance strength of power transmission unit 240 and power reception unit 310 is preferably more than or equal to 100.

In power transmission device 10, when transmission power is supplied from inverter 220 to power transmission unit 240, energy (electric power) is transferred from power transmission unit 240 to power reception unit 310 through an electromagnetic field formed between the coil of power transmission unit 240 and the coil of power reception unit 310. The energy transferred to power reception unit 310 is supplied to power storage device 350 through filter circuit 320 and rectification unit 330.

[Description of Configuration of Inverter and Turn-on Current]

Figure 3:
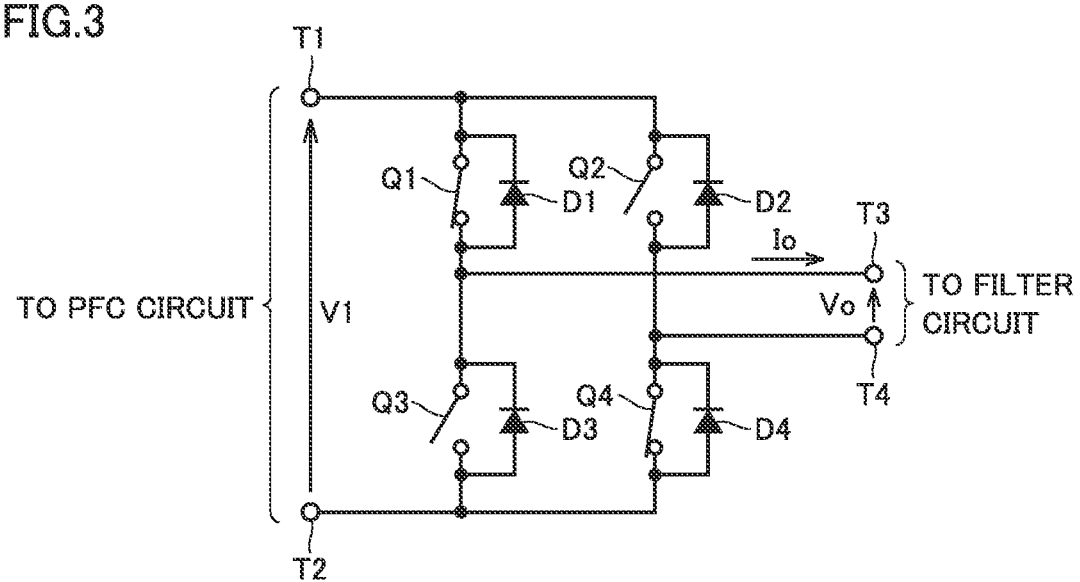
FIG. 3 illustrates a circuit configuration of an inverter 220 shown in FIG. 1.

FIG. 3 illustrates a circuit configuration of inverter 220 shown in FIG. 1. Referring to FIG. 3, inverter 220 is a voltage-source inverter, and includes power semiconductor switching elements (hereinafter briefly referred to as "switching elements" as well) Q1 to Q4 and freewheel diodes D1 to D4. PFC circuit 210 (see FIG. 1) is connected to terminals T1 and T2 on the DC side, and filter circuit 230 is connected to terminals T3 and T4 on the AC side.

Switching elements Q1 to Q4 are implemented by, for example, IGBTs (Insulated Gate Bipolar Transistors), bipolar transistors, MOSFETs (Metal Oxide Semiconductor Field Effect Transistors), GTOs (Gate Turn Off thyristors), or the like. Freewheel diodes D1 to D4 are connected in antiparallel to switching elements Q1 to Q4, respectively.

A DC voltage V1 output from PFC circuit 210 is applied across terminal T1 and T2. Following the switching operation of switching elements Q1 to Q4, an output voltage Vo and an output current Io are produced across terminals T3 and T4 (the direction indicated by each arrow in the figure shall indicate a positive value). This FIG. 3 shows, as an example, a state where switching elements Q1 and Q4 are on, and switching elements Q2 and Q3 are off. Output voltage Vo in this case is substantially equal to voltage V1 (positive value).

Figure 4:
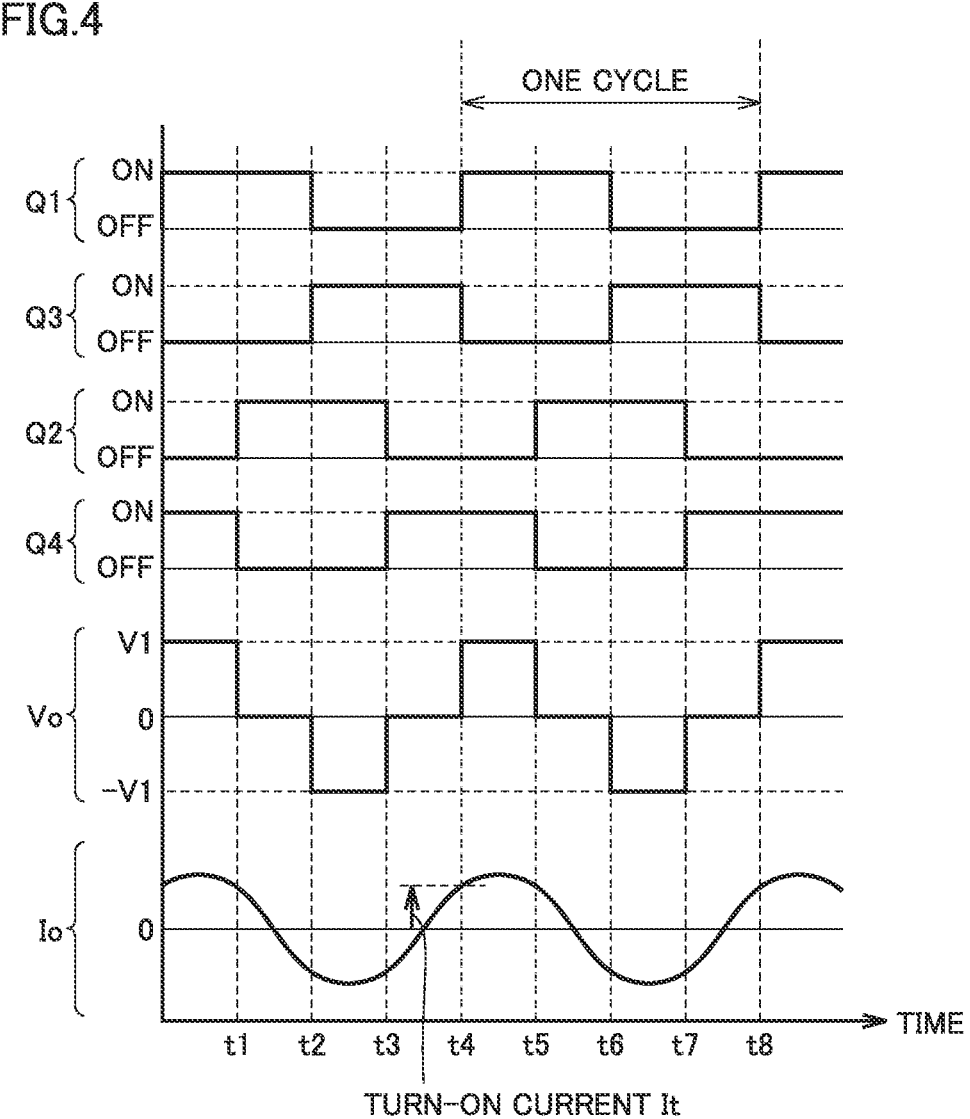
FIG. 4 illustrates switching waveforms of inverter 220 as well as waveforms of an output voltage Vo and an output current Io.

FIG. 4 illustrates switching waveforms of inverter 220 as well as waveforms of output voltage Vo and output current Io. Referring to FIGS. 3 and 4, one cycle from time t4 to time t8 will be described by way of example.

At time t4, with switching elements Q2 and Q4 being off and on, respectively, switching element Q1 is switched from off to on, and switching element Q3 is switched from on to off (the state shown in FIG. 3). Then, output voltage Vo of inverter 220 rises from 0 to V1 (positive value).

At time t5, with switching elements Q1 and Q3 being on and off, respectively, switching element Q2 is switched from off to on, and switching element Q4 is switched from on to off. Then, output voltage Vo becomes 0.

At time t6, with switching elements Q2 and Q4 being on and off, respectively, switching element Q1 is switched from on to off, and switching element Q3 is switched from off to on. Then, output voltage Vo becomes −V1 (negative value).

At time t7, with switching elements Q1 and Q3 being off and on, respectively, switching element Q2 is switched from on to off, and switching element Q4 is switched from off to on. Then, output voltage Vo returns to 0.

At time t8 after one cycle from time t4, with switching elements Q2 and Q4 being off and on, respectively, switching element Q1 is switched from off to on, and switching element Q3 is switched from on to off. Then, output voltage Vo rises from 0 to V1 (positive value) (the state identical to that of time t4).

The duty of output voltage Vo can be varied by changing the switching timing of switching elements Q1, Q3 and that of switching elements Q2 and Q4. FIG. 4 shows the case where the duty of output voltage Vo is 0.25. For example, when the switching timing of switching elements Q2 and Q4 is accelerated relative to the state shown in FIG. 4, the duty of output voltage Vo can be made lower than 0.25 (0 at minimum), and when the switching timing of switching elements Q2 and Q4 is delayed, the duty of output voltage Vo can be made higher than 0.25 (0.5 at maximum).

Transmission power can be varied by adjusting the duty of output voltage Vo. Qualitatively, transmission power can be increased by increasing the duty, and can be reduced by decreasing the duty. Therefore, power supply ECU 250 executes transmission power control for controlling transmission power to target power by adjusting the duty of output voltage Vo.

An instantaneous value It of output current Io at the rising of output voltage Vo (time t4 and time t8) is equivalent to above-described turn-on current It. The value of turn-on current It varies in accordance with voltage V1 supplied to inverter 220 from PFC circuit 210 and the drive frequency (switching frequency) of inverter 220. FIG. 4 shows the case where positive turn-on current It flows.

When positive turn-on current It flows, a reverse current (i.e., a recovery current) flows into freewheel diode D3 (see FIG. 3) connected in antiparallel to switching element Q3. When the recovery current flows into freewheel diode D3, heat generation in freewheel diode D3 increases, causing increase in losses in inverter 220. If turn-on current It is less than or equal to 0, a recovery current does not flow into freewheel diode D3, which suppresses losses in inverter 220.

Since turn-on current It varies when the drive frequency of inverter 220 varies, turn-on current It may be controlled by adjusting the drive frequency of inverter 220. Therefore, power supply ECU 250 executes the turn-on current control for controlling turn-on current It to a target value by adjusting the drive frequency of inverter 220. The target value for turn-on current It is basically set at a value of less than or equal to 0 such that a recovery current is not produced in inverter 220.

[Description of Turn-on Current Control]

Figure 5:
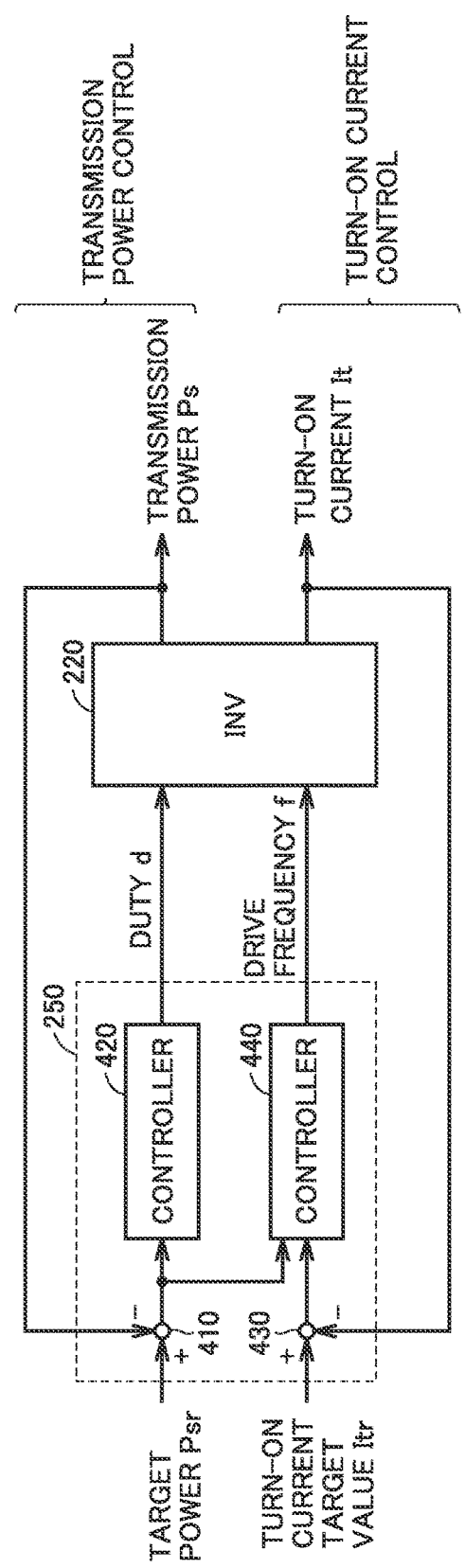
FIG. 5 is a control block diagram of transmission power control and turn-on current control executed by a power supply ECU 250.

FIG. 5 is a control block diagram of transmission power control and turn-on current control executed by power supply ECU 250. Referring to FIG. 5, power supply ECU 250 includes subtraction units 410, 430 and controllers 420, 440. Subtraction unit 410, controller 420 and inverter 220 of a control target constitute a feedback loop that performs the transmission power control. On the other hand, subtraction units 410, 430, controller 440 and inverter 220 constitute a feedback loop that performs the turn-on current control.

Subtraction unit 410 subtracts a detected value of transmission power Ps from target power Psr indicating the target value for transmission power, and outputs a calculated value to controller 420. The detected value of transmission power Ps can be calculated based on the detected values of voltage sensor 270 and current sensor 272 shown in FIG. 1, for example.

Controller 420 adjusts a duty d of output voltage Vo of inverter 220 based on the calculated value received from subtraction unit 410. The transmission power control is thereby achieved.

In more detail, if the calculated value is approximately 0 (where transmission power Ps is almost equal to target power Psr), controller 420 maintains duty d at that time. If the calculated value is a positive value (where transmission power Ps is smaller than target power Psr), controller 420 increases duty d by a predetermined adjustment amount Δd. On the other hand, if the calculated value is a negative value (where transmission power Ps is larger than target power Psr), controller 420 decreases duty d by predetermined adjustment amount Δd. Duty d is thereby adjusted such that transmission power Ps approaches target power Psr, and transmission power Ps is controlled to target power Psr. Controller 420 may execute PI control (Proportional-Integral Control) using the difference between target power Psr and transmission power Ps as an input.

Subtraction unit 430 subtracts a detected value of turn-on current It from a target current Itr of the turn-on current, and outputs a calculated value to controller 440. Target current Itr of the turn-on current is basically set at a value of less than or equal to 0 as described above. The detected value of turn-on current It is a detected value (instantaneous value) of current sensor 272 at the time when the rising of output voltage Vo is detected by voltage sensor 270 (see FIG. 1).

Controller 440 adjusts drive frequency f of inverter 220 based on the calculated value received from subtraction unit 430. Controller 440 also changes the rate of adjusting drive frequency f based on the calculated value received from subtraction unit 410. The rate of adjusting drive frequency f can be changed by changing an update cycle TP while fixing a change amount Δf of drive frequency f, or conversely, by increasing/decreasing change amount Δf of drive frequency f while fixing update cycle TP of drive frequency f. The turn-on current control is thereby achieved. Feedback control executed by controller 440 will be described later in detail.

Figure 6:
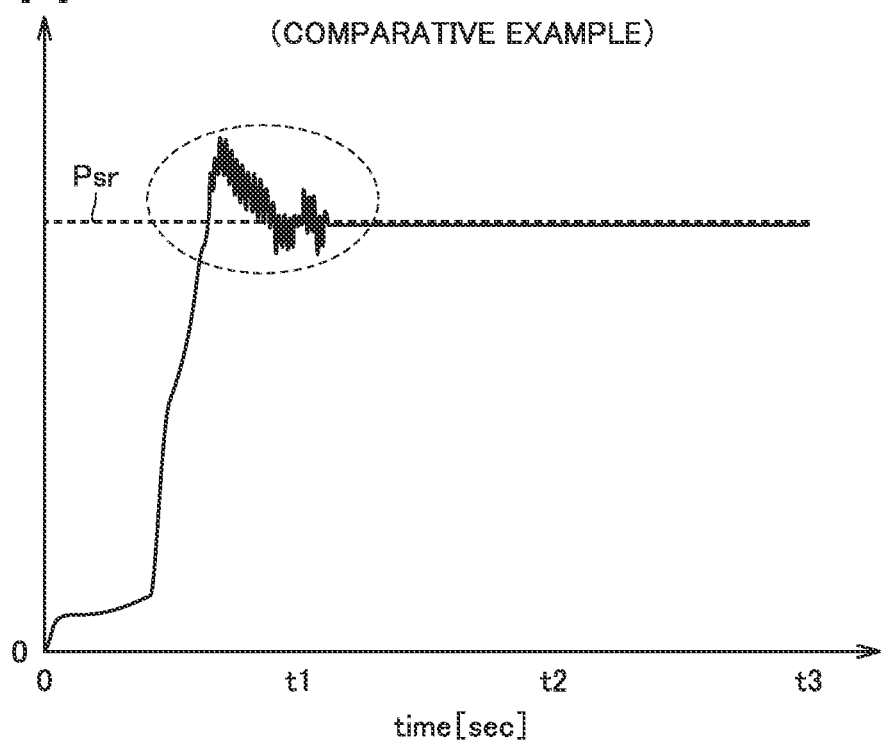
FIG. 6 is a waveform diagram showing a comparative example in which an overshoot at the rising of transmission power is large.
Figure 7:
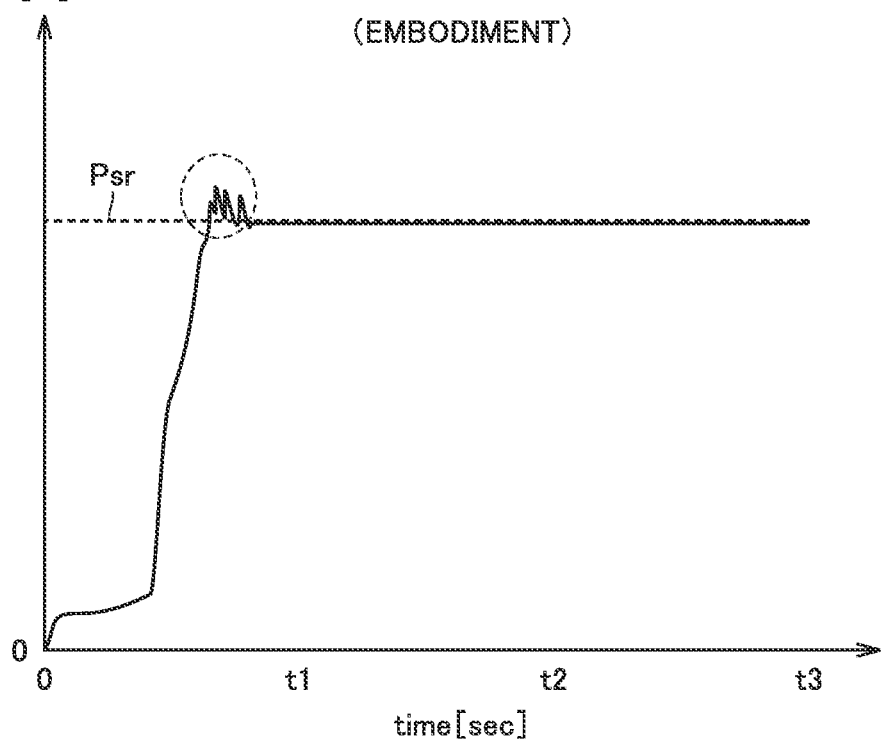
FIG. 7 is a waveform diagram showing that the overshoot at the rising of transmission power has been reduced as a result of applying the control of the present embodiment.
Figure 8:
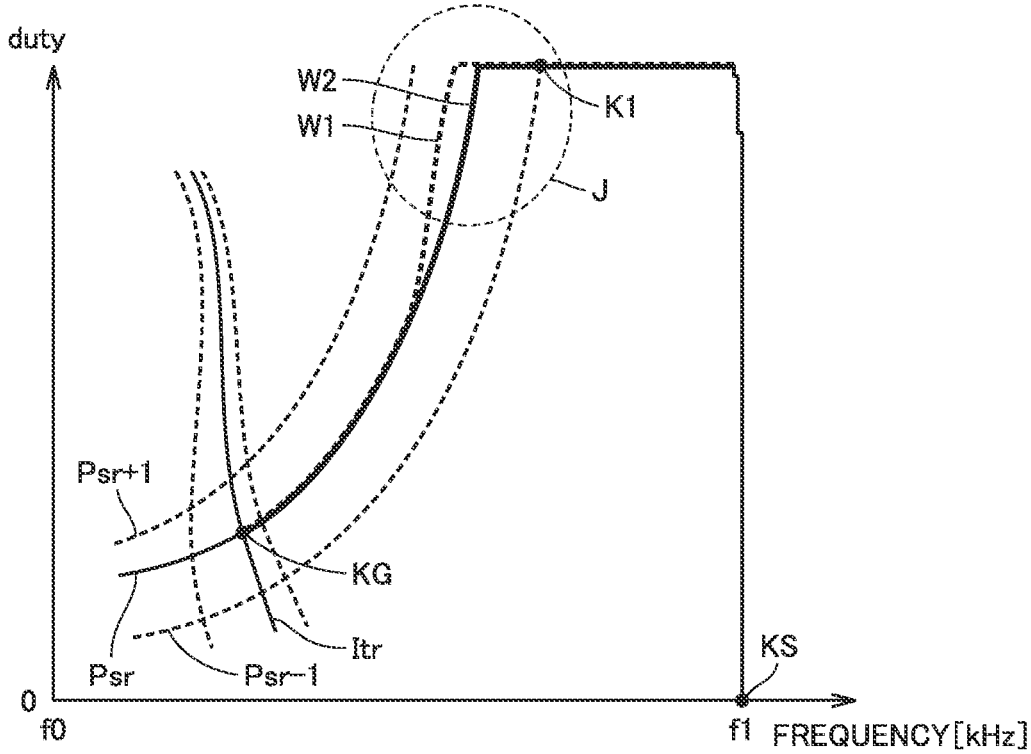
FIG. 8 illustrates how a drive frequency f and a duty d of the inverter move to a search point at the rising of transmission power.

FIG. 6 is a waveform diagram showing a comparative example in which an overshoot at the rising of transmission power is large. FIG. 7 is a waveform diagram showing that the overshoot at the rising of transmission power has been reduced as a result of applying the control of the present embodiment. FIG. 8 illustrates how drive frequency f and duty d of the inverter move to a search point at the rising of transmission power.

In the waveform of FIG. 8, a line Psr is an equal power line obtained by connecting operating points at which the inverter outputs target power. A line Psr−1 is an equal power line representing electric power lower than line Psr. A line Psr+1 is an equal power line representing electric power higher than line Psr.

A line Itr in the waveform of FIG. 8 is an equal current line obtained by connecting operating points at which the turn-on current becomes target power. In FIG. 8, when the power transmission device starts transmission of electric power, the operating point moves from a starting point KS at a drive frequency f1 and the duty of 0, and passes through an operating point K1 to reach a search completion point KG along equal power line Psr. Search completion point KG is an intersection of equal power line Psr and equal current line Itr.

Referring to FIGS. 6 and 8, in the comparative example, drive frequency f is updated in a fixed cycle when performing the turn-on current control, and as a result, electric power is shifted to the larger side with respect to equal power line Psr, as indicated by an operation waveform W1. As will be shown later enlargedly in FIG. 9, this shift corresponds to the overshoot shown in FIG. 6. The cause of this overshoot is because the response of the loop formed by subtraction unit 410, controller 420 and inverter 220 that performs the transmission power control in FIG. 5 is delayed. When the change rate of drive frequency f is fast, an associated change in transmission power also increases, so that transmission power can no longer follow the target power.

Referring to FIGS. 7 and 8, in the example in which the control of the present embodiment has been performed, when performing the turn-on current control, cycle TP of updating drive frequency f is extended from a time point (operating point K1) when transmission power has approached target power to some extent. When cycle TP of updating drive frequency f is extended, the change rate of drive frequency f decreases if change amount Δf of the drive frequency is equal. As a result, a time period in which controller 420 of FIG. 5 changes duty d to make the transmission power follow the target power can be secured, and the operating point can move substantially along equal power line Psr as indicated by operation waveform W2. Thus, a shift of electric power is suppressed, and as indicated by the waveform of FIG. 7, a reduced overshoot can also be achieved.

For example, switching of cycle TP of updating drive frequency f may be performed such that cycle TP is extended when the operating point enters a region between power lines Psr+1 and Psr−1 (indicating the operating point at which the transmission power has approached electric power Psr to some extent), and that cycle TP is shortened outside the region between power lines Psr+1 and Psr−1.

The shift of electric power in FIG. 8 will be described below in detail enlarging the waveforms.

Figure 9:
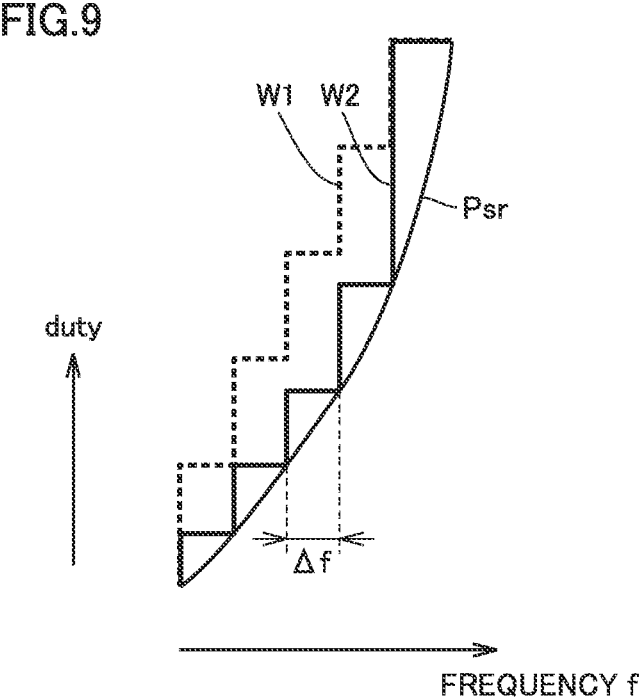
FIG. 9 illustrates enlarged waveforms of a portion indicated by a broken line J in FIG. 8.

FIG. 9 illustrates enlarged waveforms of a portion indicated by broken line J in FIG. 8. Referring to FIG. 9, the operating point changes stepwise both along waveform W1 (comparative example) and waveform W2 (the embodiment of the present application), and the operating point moves so as to follow line Psr representing target power. It is noted that waveform W1 indicates the case where update cycle TP of drive frequency f is short, and waveform W2 indicates the case where update cycle TP of drive frequency f is longer than in the case of waveform W1.

When changing drive frequency f of the inverter in order to perform the turn-on current control, the transmission power will be shifted since the load on the power transmission unit as seen from the inverter will change. Therefore, in order to continue transmitting target power Psr as transmission power Ps, it is necessary to change duty d of the switching elements of the inverter such that transmission power Ps follows target power Psr. With short update cycle TP, however, drive frequency f will be updated further before transmission power Ps completes following target power Psr. Waveform W1 in FIG. 9 indicates such a condition. In contrast, since update cycle TP is long in the case indicated by waveform W2, transmission power Ps follows target power Psr until drive frequency f is changed next.

However, if the update cycle in the case of waveform W2 is adopted all the time since immediately after the start of power transmission, it will take time to move the operating point from starting point KS to search completion point KG in FIG. 8, and the rising time will become long at the start of power transmission.

Therefore, in FIG. 8, according to the present embodiment, change amount Δf of drive frequency f is fixed, and the update cycle of drive frequency f between starting point KS and intermediate point K1 at which the transmission power has approached line Psr representing the target power is shortened (referred to as a cycle TP1) to cause the operating point to move quickly. Then, between intermediate point K1 and search completion point KG, the update cycle of drive frequency f is extended (referred to as a cycle TP2, where TP2>TP1) to improve the followability to the target power and suppress an overshoot.

Instead of changing the update cycle, change amount Δf of drive frequency f may be increased/decreased while fixing update cycle TP. In that case, representing the change amount of drive frequency f from operating point KS to K1 in FIG. 8 as Δf1, the change amount of drive frequency f from operating points K1 to KG is represented as Δf2 (Δf2<Δf1).

Figure 10:
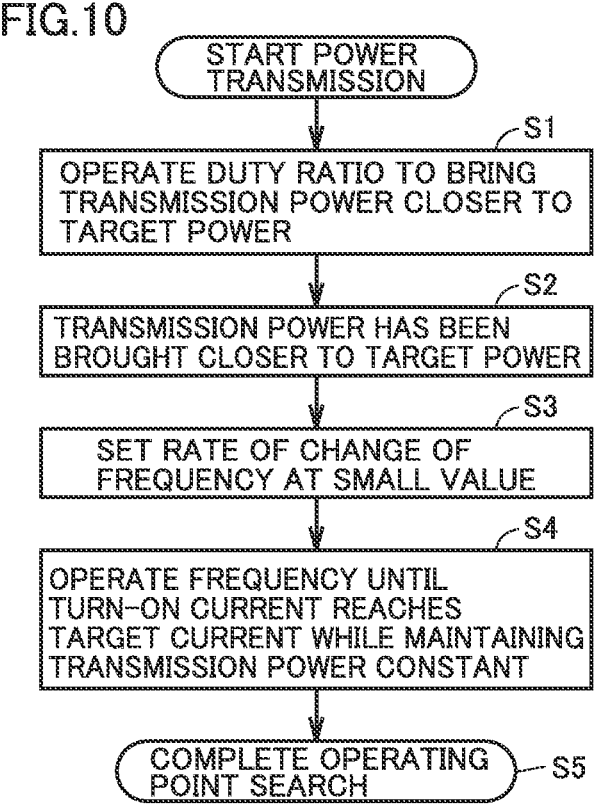
FIG. 10 is a flowchart sequentially showing the procedure from the start of power transmission to the completion of operating point search.
Figure 11:
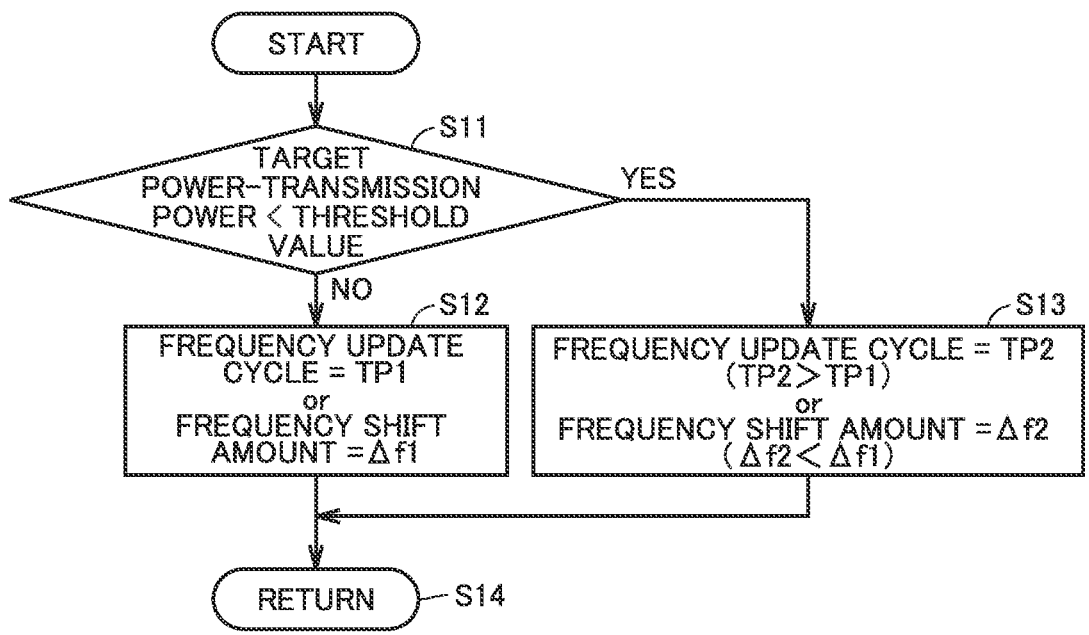
FIG. 11 is a flowchart showing control for changing a change rate of the drive frequency of the inverter.

The above control will be described with reference to a flowchart. FIG. 10 is a flowchart sequentially showing the procedure from the start of power transmission to the completion of operating point search. FIG. 11 is a flowchart showing control for changing the change rate of the drive frequency of the inverter.

Referring to FIGS. 5 and 10, when power transmission is started, first in step S1, controller 420 of power supply ECU 250 operates the duty of inverter 220 to bring transmission power Ps closer to target power Psr. At this time, the cycle in which controller 440 updates drive frequency f is at initial value TP1.

When transmission power Ps has been brought closer to target power Psr in step S2, this is recognized in step S3 by the output of subtraction unit 410, and controller 440 decreases the change rate of drive frequency f. For example, controller 440 switches the cycle of updating drive frequency f from initial value TP1 to TP2 (TP2>TP1). As a result of extending the update cycle, the rate at which drive frequency f changes decreases.

Then, in step S4, drive frequency f is operated until turn-on current It reaches target current Itr while maintaining transmission power constant by controller 420 of power supply ECU 250. Then, the operating point moves while following line Psr representing the target power in FIG. 8 to reach operating point KG in step S5, where the operating point search is terminated.

Referring to FIGS. 5 and 11, upon receipt of the output of subtraction unit 410, controller 420 of power supply ECU 250 determines whether or not transmission power Ps is larger than a value obtained by subtracting a threshold value Pth from target power Psr in step S11. This processing is equivalent to a determination in FIG. 8 whether the operating point is in the range of KS to K1 or in the range of K1 to KG.

In step S11, when Ps>Psr−Pth does not hold, the process is advanced to step S12. In step S12, controller 420 of power supply ECU 250 sets frequency update cycle TP at initial value TP1.

In step S11, when Ps>Psr−Pth holds, the process is advanced to step S13. In step S13, controller 420 of power supply ECU 250 sets frequency update cycle TP at cycle TP2 which is longer than initial value TP1.

When frequency update cycle TP is set in step S12 or S13, the process is advanced to step S14, and the control is returned to the main routine.

In step S12 and step S13, the change amount of the drive frequency may be changed while fixing frequency update cycle TP, rather than changing frequency update cycle TP. In this case, change amount Δf2 of the drive frequency set in step S13 is smaller than change amount Δf1 of the drive frequency set in step S12.

Finally, the essential part of the present embodiment will be summarized again with reference to the drawings. Referring to FIG. 1, power transmission device 10 includes power transmission unit 240 configured to transmit electric power to power reception device 20 in a contactless manner, voltage-source inverter 220 that supplies transmission power Ps to power transmission unit 240, and power supply ECU 250 that controls inverter 220.

Power supply ECU 250 executes a first control for controlling transmission power Ps to target power Psr by adjusting duty d of an output voltage of inverter 220, and a second control for controlling turn-on current It to target current Itr by adjusting drive frequency f of inverter 220, turn-on current It indicating an output current of inverter 220 at a rising of the output voltage of inverter 220. When adjusting drive frequency f in the second control, a first case is a case where transmission power Ps has a first value which is lower than target power Psr and a second case is a case where transmission power Ps has a second value which is closer to target power Psr than the first value. Power supply ECU 250 makes the change rate of the drive frequency in the second case lower than in the first case. The "first control" corresponds to the "transmission power control", and the "second control" corresponds to the "turn-on current control." Turn-on current It does not necessarily need to be controlled to target current Itr. For example, a limit value of the turn-on current may be set instead of target current Itr for the turn-on current. In this case, turn-on current It is controlled not to exceed the limit value.

Here, in the first case where transmission power Ps has a first value, (Psr−Ps>threshold value) holds, and transmission power Ps has not been brought closer to target power Psr (NO in S11 in FIG. 11). In the second case where transmission power Ps has a second value, (Psr−Ps<threshold value) holds, and transmission power Ps has been brought closer to target power Psr (YES in S11 in FIG. 11).

With such a configuration, when the power difference between transmission power Ps and target power Psr decreases, the change rate of the drive frequency also decreases. Then, transmission power Ps when adjusting drive frequency f with the shift in drive frequency is unlikely to be greatly deviated, so that the followability of transmission power Ps to target power Psr is improved. It is therefore possible to minimize the overshoot amount of transmission power Ps with respect to target power Psr, as shown in the waveform of FIG. 7.

Preferably, as shown in FIG. 5, power supply ECU 250 includes controller 420 that controls the duty of the switching elements of inverter 220 based on the power difference between transmission power Ps and target power Psr and controller 440 that changes drive frequency f based on the difference between turn-on current It and target current Itr and changes the change rate of the drive frequency when changing drive frequency f based on the power difference.

Since controller 440 changes the change rate of the drive frequency when changing drive frequency f as described above, the followability of transmission power Ps to target power Psr can be changed even if the processing of controller 420 is the same.

Preferably, as shown in step S12 and S13 of FIG. 11, assuming that change amount Δf of the drive frequency per one adjusting operation of drive frequency f is constant when changing drive frequency f in the second control (turn-on current control), changing cycle TP2 of the drive frequency in the second case is longer than changing cycle TP1 of the drive frequency in the first case.

At this time, in the turn-on current control, controller 440 changes the drive frequency by a predetermined change amount (Δf (fixed value) in FIG. 9) per one operation of updating the drive frequency when drive frequency f needs to be changed. Controller 440 changes frequency update cycle TP based on the power difference (Ps−Psr).

Specifically, as shown in FIG. 11, if power difference>threshold value holds (NO in S11), the frequency update cycle is set at TP1, and if power difference<threshold value holds (YES in S11), controller 440 extends the cycle of updating the drive frequency to be set at TP2 (TP1<TP2).

The change rate of the drive frequency in the case of adjusting drive frequency f can be changed by changing the relation between the cycle of updating the drive frequency and the change amount of the drive frequency. By extending the cycle in which controller 440 updates the drive frequency as described above, the change rate of the drive frequency can be decreased.

Although the example in which the update cycle is changed in two steps, i.e., cycles TP1 and TP2 is described above, the cycle may be extended in multiple steps as the transmission power approaches the target power.

Preferably, assuming that frequency change cycle TP is constant when changing the drive frequency in the second control (turn-on current control) as shown in steps S12 and S13 in FIG. 11, change amount Δf2 of the drive frequency per one adjusting operation of the drive frequency in the second case is smaller than change amount Δf1 of the drive frequency per one adjusting operation of the drive frequency in the first case.

At this time, in the turn-on current control, controller 440 updates the drive frequency in a fixed cycle in the case where drive frequency f needs to be changed. Controller 440 changes change amount Δf of the drive frequency per one operation of updating the drive frequency based on the power difference (Ps−Psr).

Specifically, as shown in FIG. 11, when electric power difference>threshold value holds (NO in S11), controller 440 sets change amount Δf of the drive frequency per one operation of updating the drive frequency at Δf1, and when electric power difference<threshold value holds (YES in S11), controller 440 reduces and sets change amount Δf of the drive frequency per one operation of updating the drive frequency at Δf2 (Δf2<Δf1).

The change rate of the drive frequency in the case of adjusting drive frequency f can be changed by changing the relation between the cycle of updating the drive frequency and the change amount of the drive frequency. By reducing the change amount of the drive frequency by controller 440 as described above, the change rate of the drive frequency can be decreased.

Although the example in which the change amount of the drive frequency is changed in two steps by change amounts of Δf1 and Δf2 is described above, the change amount of the drive frequency may be decreased in multiple steps as the transmission power approaches the target power.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A contactless power transmission device comprising:
    a power transmission unit configured to transmit electric power to a power reception device in a contactless manner;
    a voltage-source inverter configured to supply transmission power to the power transmission unit; and
    a control unit configured to control the inverter,
    the control unit configured to execute:
    a first control for controlling the transmission power to target power by adjusting a duty of an output voltage of the inverter; and
    a second control for controlling a turn-on current by adjusting a drive frequency of the inverter, the turn-on current indicating an output current of the inverter at a rising of the output voltage of the inverter,
    a first case being a case where the transmission power has a first value which is lower than the target power in the second control and a second case being a case where the transmission power has a second value which is closer to the target power than the first value in the second control,
    the control unit being configured to make a change rate of the drive frequency in the second case lower than in the first case.

2. The contactless power transmission device according to claim 1, wherein
    when changing the drive frequency in the second control,
    a change amount of the drive frequency per one adjusting operation of the drive frequency is constant, and
    a changing cycle of the drive frequency in the second case is longer than a changing cycle of the drive frequency in first case.

3. The contactless power transmission device according to claim 1, wherein
    when changing the drive frequency in the second control,
    a changing cycle of the drive frequency is constant, and
    a change amount of the drive frequency per one adjusting operation of the drive frequency in the second case is smaller than a change amount of the drive frequency per one adjusting operation of the drive frequency in the first case.

4. A power transfer system comprising:
    a power transmission device; and
    a power reception device,
    the power transmission device including:
    a power transmission unit configured to transmit electric power to the power reception device in a contactless manner;
    a voltage-source inverter configured to supply transmission power to the power transmission unit; and
    a control unit configured to control the inverter,
    the control unit configured to execute:
    a first control for controlling the transmission power to target power by adjusting a duty of an output voltage of the inverter; and
    a second control for controlling a turn-on current by adjusting a drive frequency of the inverter, the turn-on current indicating an output current of the inverter at a rising of the output voltage of the inverter,
    a first case being a case where the transmission power has a first value which is lower than the target power in the second control and a second case being a case where the transmission power has a second value which is closer to the target power than the first value in the second control,
    the control unit being configured to make a change rate of the drive frequency in the second case lower than in the first case.

5. The power transfer system according to claim 4, wherein when changing the drive frequency in the second control,
a change amount of the drive frequency per one adjusting operation of the drive frequency is constant, and
a changing cycle of the drive frequency in the second case is longer than a changing cycle of the drive frequency in first case.

6. The power transfer system according to claim 4, wherein
when changing the drive frequency in the second control,
a changing cycle of the drive frequency is constant, and
a change amount of the drive frequency per one adjusting operation of the drive frequency in the second case is smaller than a change amount of the drive frequency per one adjusting operation of the drive frequency in the first case.

* * * * *